(12) United States Patent
Smith et al.

(10) Patent No.: US 7,711,947 B2
(45) Date of Patent: May 4, 2010

(54) SYSTEMS AND METHODS FOR AUTOMATICALLY RECONFIGURING VIRTUAL PRIVATE NETWORKS

(75) Inventors: Robert Douglas Smith, Mainz (DE); Olaf Alexander Wobst, Mainz (DE)

(73) Assignee: ETSec, Inc., Mt. Laurel, NJ (US)

( * ) Notice: Subject to any disclaimer, the term of this patent is extended or adjusted under 35 U.S.C. 154(b) by 454 days.

(21) Appl. No.: 11/778,052

(22) Filed: Jul. 15, 2007

(65) Prior Publication Data

US 2008/0043640 A1   Feb. 21, 2008

Related U.S. Application Data

(62) Division of application No. 11/057,860, filed on Feb. 14, 2005, now Pat. No. 7,373,661.

(51) Int. Cl.
*G06F 9/00* (2006.01)
*G06F 15/16* (2006.01)

(52) U.S. Cl. ............... 713/100; 709/229

(58) Field of Classification Search ............. 713/100; 709/229

See application file for complete search history.

(56) References Cited

U.S. PATENT DOCUMENTS

| | | | |
|---|---|---|---|
| 5,751,967 A | 5/1998 | Raab et al. | |
| 6,012,088 A * | 1/2000 | Li et al. | ........ 709/219 |
| 6,049,826 A | 4/2000 | Beser | |
| 6,070,246 A | 5/2000 | Beser | |
| 6,079,020 A | 6/2000 | Liu | |
| 6,092,200 A | 7/2000 | Muniyappa et al. | |
| 6,212,559 B1 | 4/2001 | Bixler et al. | |
| 6,226,751 B1 | 5/2001 | Arrow et al. | |
| 6,314,516 B1 | 11/2001 | Cagle et al. | |
| 6,366,563 B1 | 4/2002 | Weldon et al. | |
| 6,701,358 B1 | 3/2004 | Poisson et al. | |
| 6,765,591 B2 | 7/2004 | Poisson et al. | |
| 2003/0103615 A1 | 6/2003 | Baltes | |
| 2003/0105839 A1 | 6/2003 | Ben | |
| 2003/0140131 A1 | 7/2003 | Chandrashekhar et al. | |
| 2004/0083290 A1 | 4/2004 | Chen et al. | |
| 2004/0158601 A1 | 8/2004 | Wing et al. | |
| 2004/0224668 A1 | 11/2004 | Shell et al. | |

* cited by examiner

*Primary Examiner*—Jacob Lipman
(74) *Attorney, Agent, or Firm*—Flaster/Greenberg, PC

(57) ABSTRACT

Systems and methods are disclosed for automatically configuring, managing, and maintaining a network device or VPN using a public network such as the Internet. Initial configuration of a network device or VPN occurs upon a user entering minimal information via a simple HTML page. After receipt of this minimal information, the present invention automatically configures the network device or VPN without user intervention. Thereafter, a user may modify the network device or VPN configuration via an easy-to-use and easy-to-understand graphical user interface. Parameters are presented such that a user simply checks and unchecks boxes, or clicks on radio buttons, to configure network device parameters. Upon completion of the selection, the user clicks on save, and the configuration is automatically modified. In addition, upon a significant change to any network device, the changed network device automatically initiates reconfiguration of the network device or VPN with zero input from a user.

41 Claims, 19 Drawing Sheets

```
You are logged on the Systems of: eli
```

General
☐ Start
☐ Logout
☐ Profile

Router
☐ WLAN-Settings
☐ VPN-Settings

Email
☐ Spam Protection
☐ Virus Protection

Firewall
☐ System Policies

Parental Control
☐ URL filtering

VPN Settings

Here you can configure the VPN Settings of your eli-box.

The VPN has successfully been created.

Here you can see the current members of the VPN "90-00-00".

Customer ID  Description  712    Network-Address
demo1        90-00-00              192.168.1.0        [Edit]
     710                                      714

Here you can add a new member to your VPN. Please enter the Customer ID, the password and a name for the station you want to add.

Customer ID:  [_____]  702
Password:     [_____]  704
Description:  [_____]  706    [Add] [Cancel]
                                          708
[Back]

FIG. 8
800

| | |
|---|---|
| | You are logged on the Systems of: eli |

VPN-Settings

Here you can configure the VPN-Settings of your eli-box.

☑ Activate VPN Support ——809

Your box is the owner of the vpn_1.snc-ag.de VPN.

[Edit VPN] [Delete VPN] ——811

At the moment the following stations belong to this VPN:

| Customer ID | Description | Network-Address | Subnet-Mask |
|---|---|---|---|
| demo1 | Network_Part_1 | 192.168.1.0 | 255.255.255.0 |
| demo3 | demo3 | 192.168.3.0 | 255.255.255.0 |
| 90-00-00 | Demo1 | 192.168.4.0 | 255.255.255.0 |
| 90-42-01 | test-neu | 192.168.5.0 | 255.255.255.0 |

803    801    805    807

Sidebar:

General
- ☐ Start
- ☐ Logout
- ☐ Profile

Router
- ☐ WLAN-Settings
- ☐ VPN-Settings

Email
- ☐ Spam Protection
- ☐ Virus Protection

Firewall
- ☐ System Policies

Parental Control
- ☐ URL filtering

FIG. 9
900

You are logged on the Systems of:
eli

VPN-Settings

Here you can configure the VPN-Settings of your eli-box.

Please check the customer ID and the password of the box you want to add.

Here you can see the current members of the VPN "demo1".

| Customer ID | Description | Network-Address | 909 | 911 |
|---|---|---|---|---|
| demo1 | demo1 | 192.168.1.0 | [Edit] | |
| demo3 | 90-00-01 — 903 | 192.168.2.0 — 905 | [Edit] | [Delete] |

—901

Here you can add a new member to your VPN. Please enter the Customer ID, the password and a name for the station you want to add.

Customer ID: [            ]

Password: [            ]

Description: [                    ]   [ Add ]   [ Cancel ]

[ Back ]

Sidebar:
- General
  - ☐ Start
  - ☐ Logout
  - ☐ Profile
- Router
  - ☐ WLAN-Settings
  - ☐ VPN-Settings
- Email
  - ☐ Spam Protection
  - ☐ Virus Protection
- Firewall
  - ☐ System Policies
- Parental Control
  - ☐ URL filtering

You are logged on the Systems of: eli

General
- Start
- Logout
- Profile

Router
- WLAN-Settings
- VPN-Settings

Email
- Spam Protection
- Virus Protection

Firewall
- System Policies

Parental Control
- URL filtering

Profile

Here you can change your personal data.

New password: [          ]

Retype new password: [          ]

[ Save ]

FIG. 16
1600

| General | Spam Protection |
| --- | --- |
| ☐ Start ☐ Logout ☐ Profile | Here you can configure the SPAM filter, to eliminate unwanted, unsolicited commercial eMail-messages. |

You are logged on the Systems of: eli

The SPAM protection rules have successfully been updated.

○ Off (Deactivates the SPAM filter)
○ Mark (Inserts header that marks the message as SPAM)
◉ Drop (Automatically deletes the message)
○ Bounce (Bounces the message back to the sender)
○ Forward (Forwards the message to the specified address)

eMail: [          ]

Save

Router
☐ WLAN-Settings
☐ VPN-Settings

Email
☐ Spam Protection
☐ Virus Protection

Firewall
☐ System Policies

Parental Control
☐ URL filtering

You are logged on the Systems of: eli

URL Filtering Categories

Here you can select the URL categories, that you want blocked:

| | | | |
|---|---|---|---|
| ☑ Adult/Mature Content | ☐ Cultural Institutions | ☐ Religion | |
| ☑ Pornography | ☐ Financial Services | ☐ Shopping | |
| ☑ Sex Education | ☑ Brokerage/Trading | ☐ Auctions | |
| ☑ Intimate Apparel/Swimsuit | ☐ Games | ☐ Real Estate | |
| ☑ Nudity | ☐ Government/Legal | ☑ Society/Lifestyle | |
| ☑ Alcohol/Tobacco | ☑ Military | ☑ Gay/Lesbian | |
| ☑ Illegal/Questionable | ☑ Political/Activist Groups | ☐ Restaurants/Dining/Food | |
| ☑ Drugs | ☐ Health | ☐ Sports/Recreation/Hobbies | |
| ☑ Gambling | ☑ Hacking/Proxy Avoidance | ☐ Travel | |
| ☑ Hate/Racism | ☐ Search Engines/Portals | ☐ Vehicles | |
| ☑ Violence/Hate/Racism | ☐ Web Page Hosting | ☐ Humor/Jokes | |
| ☑ Weapons | ☐ Web Communications | ☑ Streaming Media/MP3 | |
| ☑ Abortion | ☐ Job Search/Careers | ☑ Educational Cheating | |
| ☑ Activist/Advocacy Groups | ☐ News/Media | ☐ Software Downloads | |
| ☐ Arts/Entertainment | ☑ Personals/Dating | ☑ Pay to Surf | |
| ☐ Business/Economy | ☐ Recreation and Hobbies | ☑ Glamour | |
| ☐ Cult/Occult | ☐ Reference | ☐ For Kids | |
| ☑ Illegal Drugs | ☑ Chat/Instant Messaging | ☑ Web Advertisements | |
| ☐ Education | ☑ Email | ☑ Web Hosting | |
| ☐ Educational Institutions | ☑ Newsgroups | ☑ Unrated | |

☐ Select/Deselect all categories

[ Save ]

General
☐ Start
☐ Logout
☐ Profile

Router
☐ WLAN-Settings
☐ VPN-Settings

Email
☐ Spam Protection
☐ Virus Protection

Firewall
☐ System Policies

Parental Control
☐ URL filtering

SYSTEMS AND METHODS FOR AUTOMATICALLY RECONFIGURING VIRTUAL PRIVATE NETWORKS

CROSS-REFERENCE TO RELATED APPLICATIONS

This application is a divisional of application Ser. No. 11/057,860, filed Feb. 14, 2005 now U.S. Pat. No. 7,373,661, entitled Systems and Methods for Automatically Configuring and Managing Network Devices and Virtual Private Networks, the entire disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

Embodiments of the present invention relate to the field of network devices. More specifically, the present invention relates to systems and methods for automatically configuring and managing network devices such as broadband routers and virtual private networks.

Many systems and methods have been created to provide communication between individual computers of a centralized, single site organization through a private network. Computers may be interconnected through telephone lines, coaxial cables, optical fibers, radio or microwave communication links, earth-orbiting satellites, or other means. Such communications can include electronic mail, file sharing and transferring, and database sharing.

The most commonly used network is the local area network ("LAN"). LANs consist of interconnected computers that provide different functions such as a host or server. A host computer sends and receives information of the network in forms of packets of data. A server distributes the data to network users along with the host computer. These computers are interconnected through the use of bridges, switches, routers, and gateways. A bridge is a device that is connected to at least two LANs and transmits data between the LANs. A router provides similar services, but also determines the optimum path for the data by using network identifiers. LANs provide a high level of security when they are properly managed and configured since all information transfer occurs within a single site.

Other systems have been created to provide communication between several single site organizations. For example, this may be performed using a wide area network ("WAN"). WANs interconnect offices or various organizational sites via private communication connections such as leased lines. WANs are virtually identically to LANs with the exception of the spatially extended interconnections. Although these systems can be expensive due to the lease cost of the leased lines and the additional administrative cost of managing a network encompassing a large geographic area, they also provide an adequate amount of security when they are properly managed.

In recent years, technical advancement and declining prices have made it commonplace for workplaces to provide Internet access via a local Internet Service Provider ("ISP") to some or all of their employees. Besides providing a vast amount of informational resources, the Internet provides electronic communication to any computer also connected to the Internet. This innovation provides a relatively easy method for members of an organization to communicate with members of their organization who are traveling, working from home, or are located at other geographic locations. However, a large disadvantage of using the Internet for communications is accessibility of the Internet to the general public. Since the exact route of the data is indeterminable, an Internet user risks eavesdropping and information theft. An even greater risks is that communications can be intercepted and altered before reaching there intended recipient. Due to these risks, many organizations are unwilling to expose their associates' and employees' communications to public network space such as the Internet.

With these security issues in mind, many systems and methods have been created to provide more secure communication between private computer networks over a public network such as institutional intranets and the Internet. One of the first systems to arise was the VPN. A VPN has the characteristics of a private network but provides connectivity via a shared public network infrastructure. VPNs include intranet VPNs, remote access VPNs, and extranet VPNs. A VPN incorporates access control, encryption technologies, and tunneling to achieve the security inherent in private networks while taking advantage of the infrastructure, economies of scale, and established management resources of public networks. However, a downfall of VPNs exists in large organizations in which the size of the VPN may cause maintenance of the VPN to become an increasingly complex task often causing extended time periods to perform necessary updates.

To alleviate the expense of maintaining a VPN, many third party service providers such as ISPs offer managed VPNs to organizations desiring complex VPNs having increased levels of communication security. Typically, the service provider has a network operations center that controls and maintains the VPN remotely and locally based on the requirements provided by the organization.

Increased levels of security may be obtained using a variety of methods. For example, cryptography systems may be employed to minimize theft of data by an unauthorized third party. Such systems encrypt transmitted data such that only the intended recipient's system can interpret the encryption. With these systems, unintended parties may receive the data, however, they are unable to interpret the encrypted data with their system.

Once such commonly employed cryptography system is public key cryptography. In public key cryptography, also known as asymmetric encryption, a public and a private key exist for each user in the communication network. The encryption key is a code or number that can only be read by its respective encryption algorithm. Two users communicate data only by knowing each other's public code. One user's public key, which is known to all users of the network and is generally accessible from one location, is decoded by the other user's private key, which is only known by the owner of the key. Since only the intended recipient has the private key, only that user can decode and access the data. In addition to the relationship defined by the users' keys, the sender encodes the data with its private key to indicate to the user that the sender is authentic.

Typically, the user's keys are generated and maintained by a certification authority. The user's private key is delivered to the user via electronic mail, regular mail, or a data storage device such as a compact disc ("CD"). The user's private keys are stored only (i.e., they cannot be downloaded), while the user's public keys can be downloaded from the certification authority when needed by another sender. The certification authority generates "certificates" or signed messages that specify the name of the user as well as the user's public key to verify the user's identity.

Secure Sockets Layer ("SSL") is a commonly employed security protocol that may be implemented in conjunction with a cryptography system such as public key cryptography. This protocol is widely used for transmission of sensitive data via the Internet, such as credit card data, to a vendor's Internet web site. When an SSL session is initiated, the web site's server sends a digital certificate to the user's Internet browser (e.g., Internet Explorer®). The browser receives the digital certificate, which is used to authenticate the web site accessed by the user. The browser maintains an inventory of the certificates issued by public certificate authorities and is able to contact the respective authority to ensure that the received digital certificate has not been revoked. After verification that the digital certificate is valid, the user's browser uses the public key received from the web site to encrypt a random number, which it transmits to the Web site. This random number may be used as sent or may be modified to create a secret session key for subsequent exchange of private information between the user's system and the web site.

Another commonly used security protocol is IP Security Protocol ("IPsec"). IPsec was created by the Internet Engineering Task Force to provide authentication and encryption for data transmitted via the Internet. An advantage of IPsec in comparison to SSL is that IPsec provides services at layer three and secures all applications in the network unlike SSL, which provides services at layer four and only secures two applications. IPsec can access both Internet and non-Internet applications. Although IPsec provides a higher level of security, IPsec requires more maintenance. For example, IPsec requires an installation at the client (e.g., a user's personal computer) whereas SSL is typically a component of a standard web browser.

BRIEF SUMMARY OF THE INVENTION

Briefly stated, in one aspect of the present invention, a method for automatically reconfiguring a VPN is provided. This method includes the steps of: receiving VPN data input by a user at a portal; transmitting the VPN data from the portal to at least one management device; creating at least one device configuration file at the at least one management device; automatically establishing at least one first communication between the at least one management device and at least one network device via at least one network connection of at least one network; transmitting the at least one device configuration file from the at least one management device to the at least one network device via the at least one network connection; and analyzing each of the at least one device configuration files locally at the at least one network devices to determine whether reconfiguration of the network device is required. Furthermore, if the reconfiguration of the network device is required, performing the sub-steps of: automatically establishing a second communication between the network device and the management device via the network connection; receiving a request at the management device from the network device for a VPN configuration file via the network connection; and transmitting the VPN configuration file from the management device to the network device via the network connection; wherein at least one VPN is automatically reconfigured upon local processing of at least one of the device configuration file, the VPN configuration file, and combinations thereof.

BRIEF DESCRIPTION OF THE SEVERAL VIEWS OF THE DRAWINGS

A further understanding of the present invention can be obtained by reference to the embodiments set forth in the illustrations of the accompanying drawings. Although the illustrated embodiments are exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 7 depicts a GUI screen for addition of a second member of a VPN according to one embodiment of the present invention.

FIG. 8 depicts a GUI screen for editing or deleting a VPN according to one embodiment of the present invention.

FIG. 9 depicts a GUI screen for editing or deleting an existing VPN member according to one embodiment of the present invention.

FIG. 14 depicts a GUI screen for configuration of a profile according to one embodiment of the present invention.

FIG. 16 depicts a GUI screen for the configuration of spam protection according to one embodiment of the present invention.

FIG. 19 depicts a GUI screen for the configuration of URL filtering according to one embodiment of the present invention.

DETAILED DESCRIPTION OF THE INVENTION

Figure 1:
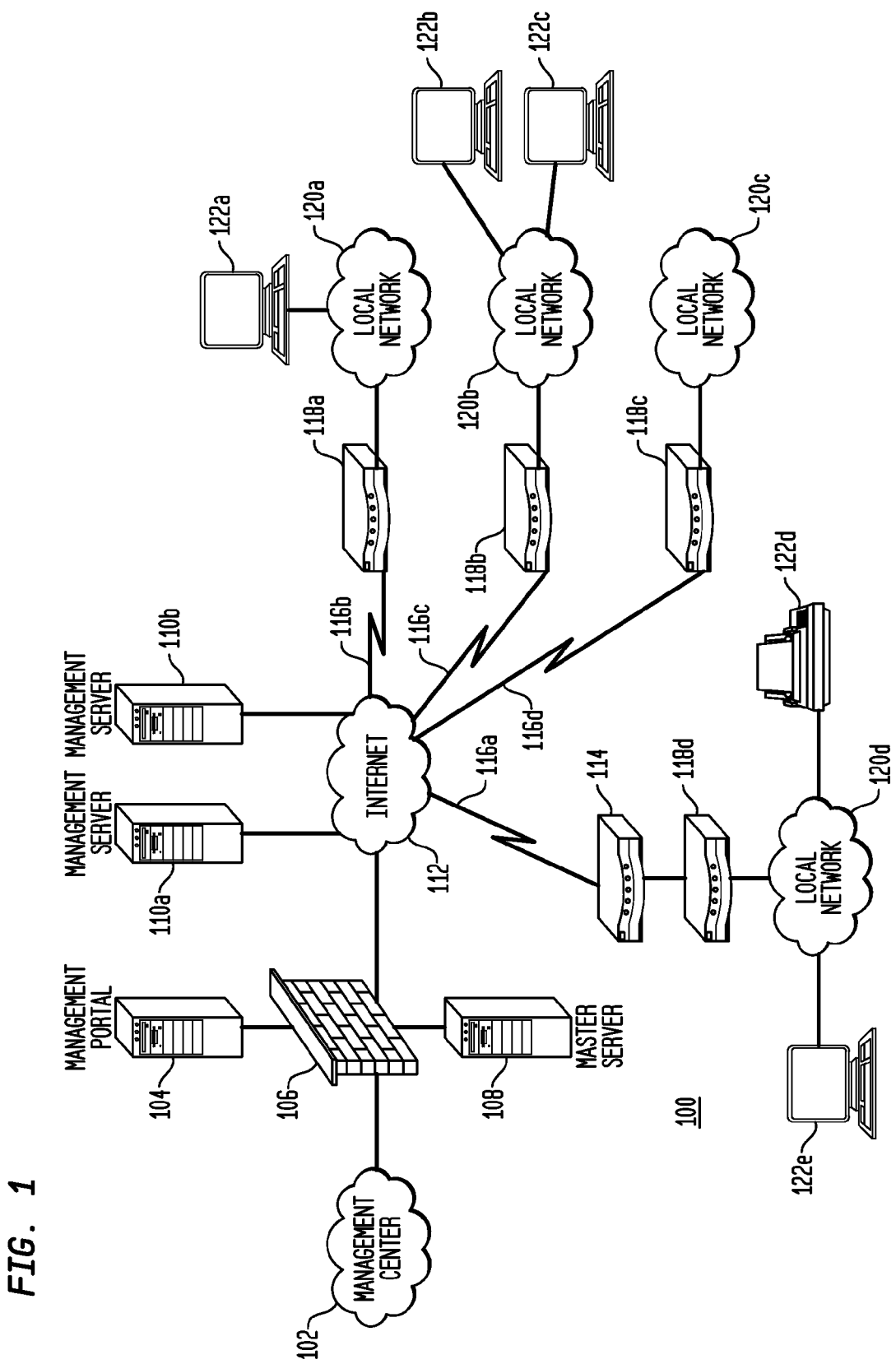
FIG. 1 depicts a schematic view of a network environment in accordance with an embodiment of the present invention including, inter alia, a management center, management portal, firewall, master server, regional servers, the Internet, a router, network connections, network devices, local networks, and local network devices.

Referring first to FIG. 1, depicted is network environment 100 in accordance with one embodiment of the present invention. In this embodiment, network environment 100 includes management center 102, management portal 104, firewall 106, master server 108, management servers 110, Internet 112, router 114, network connections 116, network devices 118, local networks 120, and local network devices 122.

In one embodiment of the present invention, network device 118 is a broadband device such as a cable or Digital Subscriber Line ("DSL") modem having one or more features such as wireless gateways (e.g., an 802.11 gateway, a Bluetooth® gateway, an Infrared Data Association ("IrDA") gateway, etc.), voice over Internet Protocol ("VoIP"), multi-port switching, VPN, firewalls, anti-virus protection, spam control, content filtering, etc. However, the present invention is not so limited. Network device may be virtually any device having a network connection to at least one other network device regardless of its features.

Managed network devices 118 may be incorporated in some embodiments of the present invention. In these embodiments, network devices 118 are managed and maintained remotely. That is, maintenance functions such as updates to virus definitions, block lists, policies, and firmware are performed from a remote management center such as management center 102 and its associated management portal 104, master server 108, and management servers 110a-110b, via a network connected to both management center 102 and the managed network device 118 (e.g., Internet 112).

In preferred embodiments of the present invention, management center 102 and one or more of its associated devices are protected by firewall 106. However, alternate embodiments are envisioned in which no firewall, or more than one firewall, is incorporated. Also, although management servers 110a-110b are a part of the management center infrastructure, such devices may be hosted by a third party such as an ISP. In these embodiments, all management servers and master servers have identical copies of the authoritative database and a change to any management server database is automatically updated in the databases of other management servers and the master server via database replication. Additionally, the present invention may include any combination of managed and unmanaged network devices 118 without departing from the scope of the present invention.

In some embodiments of the present invention, the master and management server databases are formed of a plurality of tables. For example, such tables may include network device configuration parameter tables, web content filtering software parameter tables, channel tables, customer information tables, ISP tables, ISP rights tables, navigation tables, policy tables, user tables, VPN tables, and the like.

In some embodiments, network device 118 includes a multi-port switch, such as an Ethernet switch, and/or a wireless gateway that allows local devices to communicate with each other and network device 118 in a local area network ("LAN") configuration. For example, local device 122a is a personal computer connected to network device 118a via a hardwired or wireless connection to form local network 120a. Similarly, local devices 122b and 122c are personal computers connected to network device 118b via hardwired or wireless connections to form local network 120b. In yet another example, local devices 122d and 122e are a network-compatible printer and personal computer, respectively, connected to network device 118d via hardwired or wireless connections to form local network 120d.

In some embodiments of the present invention, network device 118 includes a DHCP server. This server may be hardware or software configured to automatically assign network addresses such as Internet Protocol ("IP") addresses, subnet masks, and related IP information to local devices 122 upon such log in of such devices to local network 120. Related IP information may include, but is not limited to, default gateways and network addresses for Domain Name System ("DNS") servers. However, alternative embodiments may be created in which users manually assign permanent network addresses, subnet masks, and related IP information to local devices 122. In yet other embodiments, such parameters may be automatically assigned by hardware or software other than a DHCP server.

During standalone operation, network devices 118a-118d connect local networks 120a-120d, respectively, to Internet 112 via internal hardware such as a modem including, but not limited to, a cable or DSL modem. In turn, this internal modem is typically coupled to network connections 116 such as a telephone line, cable, etc. For example, network connections 116a and 116b are cables such as coaxial cables typically wired from a cable television company's existing wiring infrastructure to the location of network device 118. Similarly, network connections 116c and 116d are xDSL and T1 cabling such as telephone-grade conductors wired from a telephone company's existing wiring infrastructure to the location of network device 118. However, other varieties of network connections or wireless connections may also be incorporated without departing from the scope of the present invention.

Network connections 116, or wireless connections, typically connect network devices 118 to the equipment of a third party ISP. This equipment facilitates network device 118's access of Internet 112. Such connections allow each local device 122 connected to the respective local network 120 to also access the Internet for services such as, but not limited to, electronic mail, surfing the Internet, etc. via network device 118's access to Internet 112

It is envisioned that a user of a first network device such as network device 118a and its associated local network 120a may wish to add a remote local network such as local network 120d, and its associated local devices 122d and 122e, to local network 120a. However, since local network 120d may be located at a relatively far distance from local network 120a, it may be cumbersome or expensive to connect local networks 120a and 120d via a physical or wireless connection. In this scenario, a user may implement the systems and methods of the present invention to automatically create a VPN.

Figure 2:
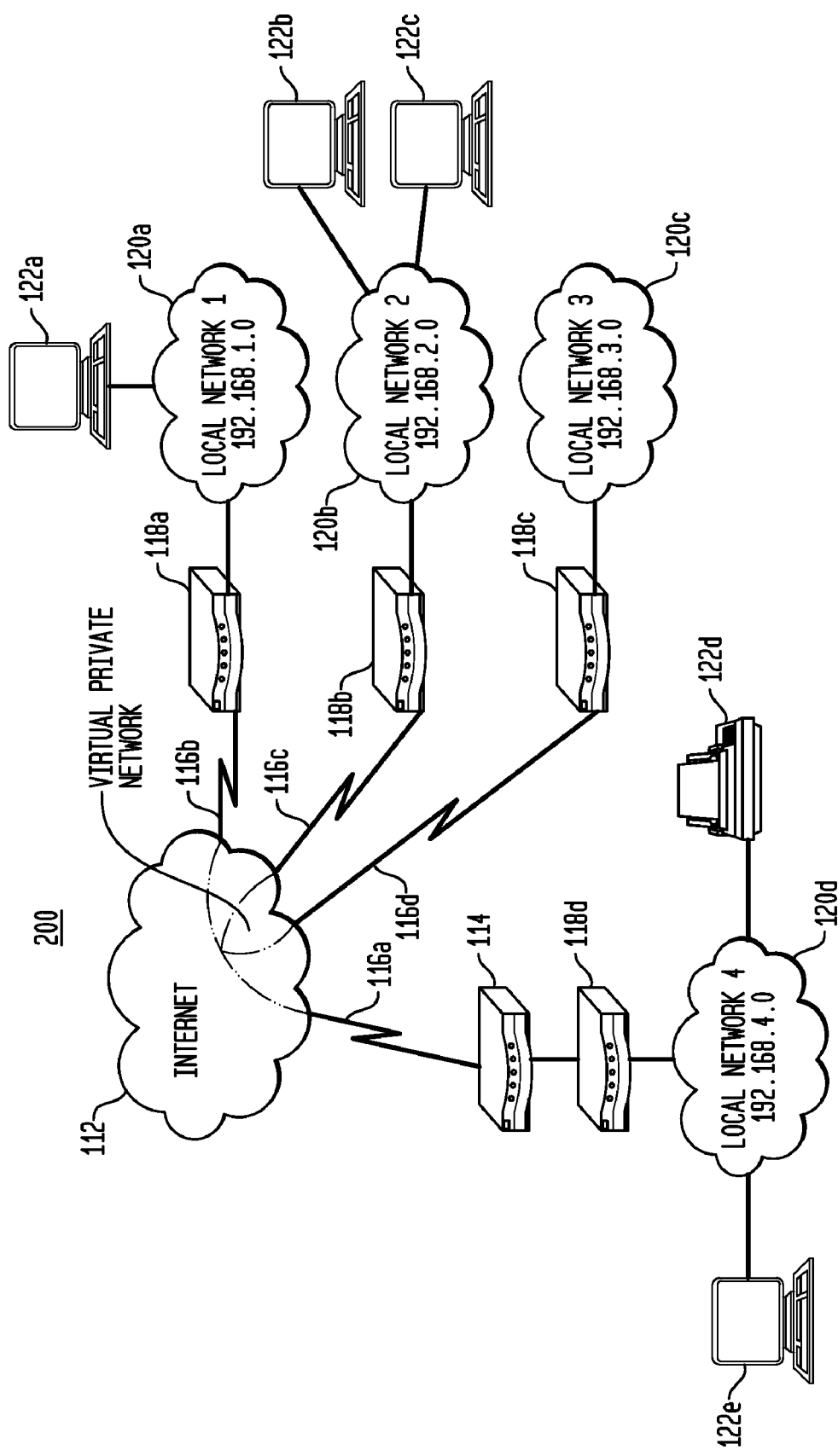
FIG. 2 depicts a schematic view of one embodiment of a VPN created using the systems and methods of the present invention including, inter alia, the Internet, a router, network connections, network devices, local networks, and local network devices.

Referring now to FIG. 2, depicted is one embodiment of a VPN created using the systems and methods of the present invention. VPN 200 includes many of the devices included in network embodiment 100. More specifically, VPN 200 includes Internet 112, router 114, network connections 116, network devices 118, local networks 120, and local network devices 122.

After creation of the VPN as discussed herein, network devices 118a and 118d are connected to each other via the same hardwired and wireless connections present prior to creation of the VPN. In addition, each of the network devices 118a and 118d has the same external network address. That is, each of the network devices 118a and 118d may still be accessed by devices that are not members of the VPN via the Internet through the same external network address. However, after creation of the VPN, each of network devices 118a and 118d may communicate with local devices 122 coupled to the local network 120 of other VPN members using the local device 122's internal network address as if the network device 118 is connected directly to the respective local network 120. That is, the VPN is transparent to the user and the user operates as if all devices are a part of the same local network.

Figure 3:
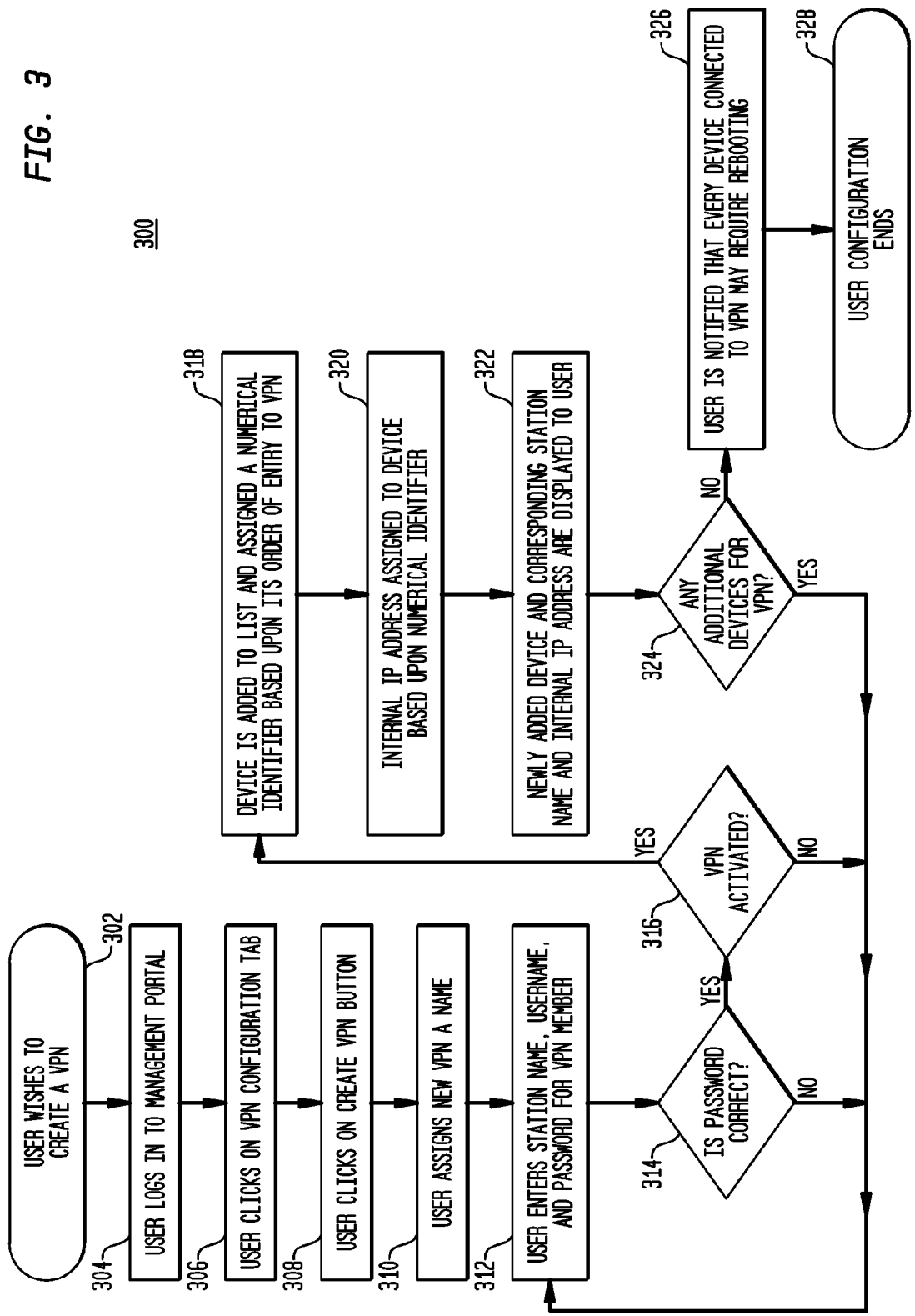
FIG. 3 depicts a flowchart of the steps in one embodiment of a process for user configuration to initiate automatic creation of a VPN.

To initiate automatic creation of a VPN, a user performs a process similar to, but not limited to, user configuration process 300 illustrated in FIG. 3. User configuration process 300 begins at 302 at a point in which a user decides to create a VPN. At 304, the user logs in to a management portal such as management portal 104 using a local device 122 residing on the same local network 120 as a network device such as network device 118. For example, a user may use a local device 122a such as a personal computer to log in to management portal 104 through Internet 112 via network device 118a's connection of local device 122b to Internet 112. After the user logs in to the management portal, user configuration process 300 proceeds to 306.

At 306, the management portal to which the user is connected provides a GUI to the user's local device 122 in the form of an Internet web page. From the main screen of the GUI, a user clicks on the "VPN Configuration" tab causing the VPN configuration screen to be displayed at local device 122. User configuration process 300 then proceeds to 308, at which the user clicks on the "Create VPN" button on the VPN Configuration screen of the GUI. Once the user clicks the "Create VPN" button, user configuration process 300 proceeds to 310, at which the user is prompted to assign a name to the VPN. Typically, this name identifies the use of the VPN such as its corresponding business or individual owner. However, any name may be assigned without departing from the scope of the present invention.

Once a name has been assigned to the VPN such as VPN 200, user configuration process 300 proceeds to 312. At 312, a VPN Setting screen is displayed to the user such as VPN Setting screen 600 depicted in FIG. 6. At this screen, the user is prompted to enter a description for network device 118 in description field 606, as well as the existing customer ID and password for network device 118 in customer ID and password fields 602 and 604, respectively. That is, the user is prompted to enter the existing customer ID and password for network device 118 that is coupled to the same local network 120 as the user's local device 118. After entry of the data, the user clicks add button 608 to proceed to 314.

Once the user enters the username and password via the local GUI, this data is transmitted via Internet 112 to the management portal, which verifies the network device's password information at 314. In one embodiment, the management portal accesses the master server's database to determine if the inputted password matches the password information contained in the username's associated data records. In another embodiment of the present invention, management portal accesses a management server's database for this information. However, alternate embodiments of password verification may be incorporated without departing from the scope of the present invention. If, at 314, the entered username and password are incorrect, user configuration process 300 returns to 312 and allows the user to re-enter the information. However, if at 314, the username and password information are verified, user configuration process 300 proceeds to 316.

At 316, the management portal queries a master or management database to determine if the network device is enabled for VPN operation. This option may be enabled or disabled by a local network device user. If the network device is enabled for VPN operation, user configuration process 300 proceeds to 318. However, if VPN operation is not enabled, user configuration process 300 returns to 312, at which a user may attempt to add a different, VPN-enabled network device.

At 318, network device 118 is added to a list of network devices 118 that are members of the VPN under creation. The management service assigns network device 118 a position on the list based upon the information contained in the database of a master or management server. Also, each network device 118 is assigned a unique numerical identifier based upon its order of entry to the VPN. That is, each network device 118 in the VPN shall be assigned a unique numerical identifier. For example, network device 118 having the same local network 120 as the local device 122 from which the user logged in to the management portal will be the first network device added to the list and is therefore assigned a numerical identifier of one. The second network device 118 added to the VPN as per the method discussed below shall be assigned a numerical identifier of two, the third network device 118 added to the VPN shall be assigned a numerical identifier of three, and this process of assigning numerical identifiers shall continue until all network devices 118 to be included in the VPN have been assigned an identifier.

In an embodiment of the present invention, the management portal transmits the list data including numerical identifiers to a master or management server. Upon receipt, the server updates its database with the list information. All other databases are then updated via database replication.

Database replication occurs continuously within the systems and methods of the present invention. Upon a change to any master or management server database, all other databases are immediately updated, thereby creating and maintaining backup management servers. In embodiments that include a master server, the master server does not manage any network devices, but rather retains the master, authoritative database for all network devices and VPNS. That is, if a management server database is damaged, the management server receives a new copy of the authoritative database from the master server. However, alternate embodiments are envisioned that do not include a master server. In these embodiments, the failed management server receives a new copy of the current database from one of the other management servers. In either embodiment, since all management servers have identical copies of the current database, each network device has a designated backup server to handle its requests, as described herein, if it is not able to communicate with or receive information from its primary management server.

User configuration process 300 then proceeds to 320, at which an internal network address is assigned to network device 118 based upon its numerical identifier. For example, network device 118 having a numerical identifier of one may be assigned an internal network address of 192.168.1.0/24, wherein network device 118's numerical identifier is the third number of the dotted decimal notation and /24 indicates that the size of the network is 24 network bits. In this scenario, all additional network devices 118 will have network addresses having the same first and second numbers of the dotted decimal notation (i.e., 192 and 168), however, the third number for each of the network device 118's network address will vary as it will also equal the numerical identifier of the corresponding network device 118.

At 322, the customer ID, description, and internal network address of network device 118 added to the VPN are displayed to the user. In one embodiment, this display is similar to VPN setting screen 700 as depicted in FIG. 7. The customer ID, description, and internal network address of the added network device 118 are displayed in customer ID, description, and internal network address display fields 710, 712, and 714, respectively. In this screen, customer ID, password, and description fields 702, 704, and 706, respectively, are cleared to allow a second VPN member to be added to the VPN.

At 324, the user decides whether an additional member will be added to the VPN. If an additional member will be added, user configuration process 300 returns to 312 at which point the user enters a customer ID, description, and password. In the embodiment depicted in FIG. 7, the customer ID, password, and description are entered in customer ID, passwords, and description fields 702, 704, and 706, respectively. Thereafter, steps 312 through 322 are repeated until all members have been added to the VPN. However, if at 324, the user indicates to the management portal that there are no additional members to be added, user configuration process 300 proceeds to 326. Optionally, at 326, the user is notified that every network device 118 and every local device 122 including personal computers, network printers, network copiers, etc. to be connected to the new VPN may require rebooting. User configuration process 300 then proceeds to 328, at which user configuration process 300 ends.

Figure 4:
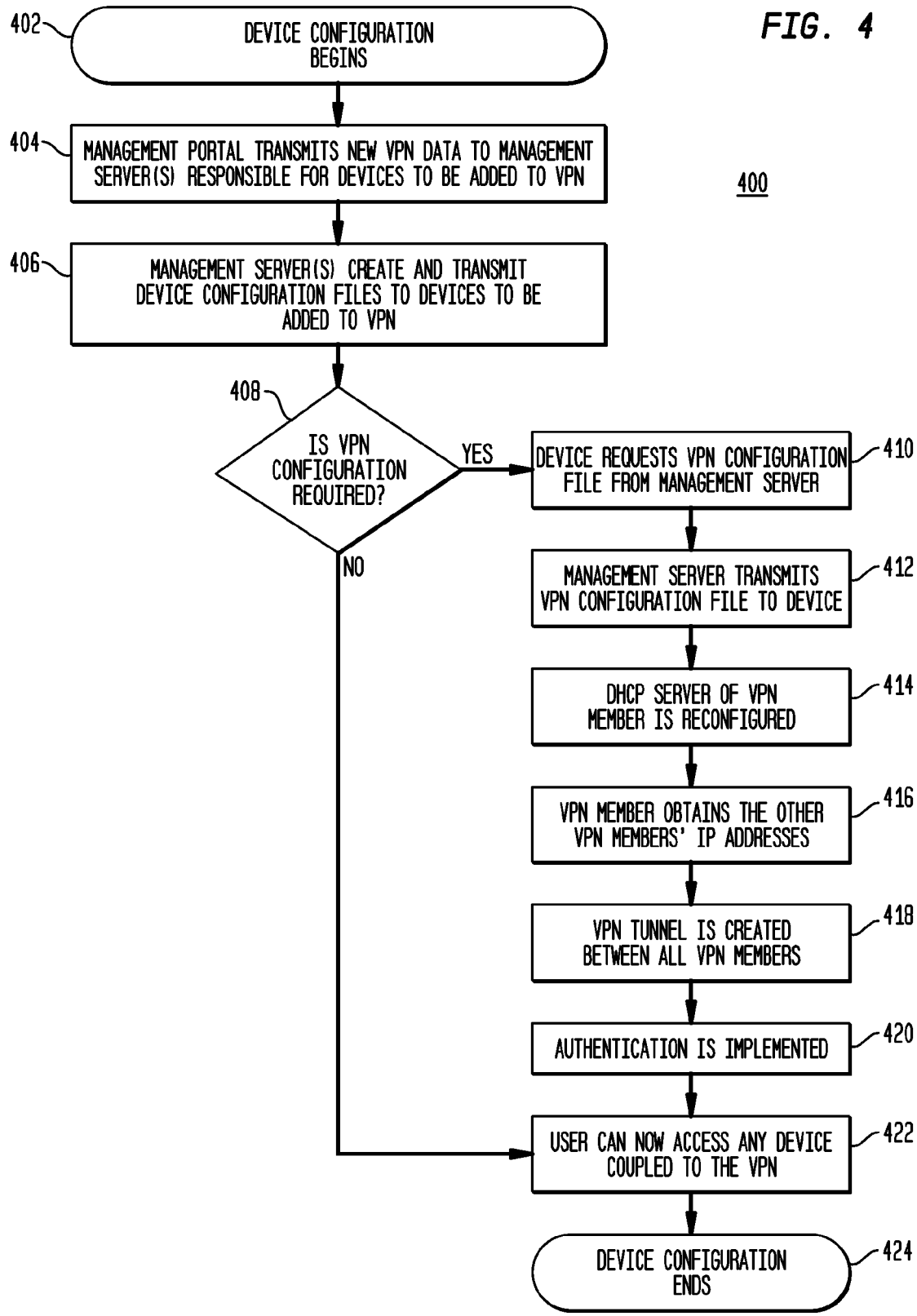
FIG. 4 depicts a flowchart of the steps in one embodiment of a process for automatic device configuration for the creation of a VPN.

Upon completion of the user configuration process such as user configuration process 300, automatic device configuration occurs using a process similar to device configuration process 400 as depicted in FIG. 4. Device configuration process 400 begins at 402 at a point after which a user has finished the user configuration process. At 404, the management portal to which the user logged in to for entry of the configuration parameters for the new VPN transmits the new VPN data to the management server(s) responsible for managing the network devices designated as members of the VPN. Preferably, such transmission occurs internally within a private network connecting the management portal to the management servers. However, embodiments are envisioned in which the management portal communicates with the management servers via a public network such as the Internet.

In one embodiment of the present invention, the management servers may be regional management servers. That is, each management server may be responsible for managing all network devices located in a particular region (e.g., one regional management server per country, one regional management server per state. etc.). However, other non-regional embodiments are envisioned without departing from the scope of the present invention. For example, in lieu of individual management servers, one master management server may be substituted. In fact, embodiments of the present invention are envisioned in which one high-powered server performs all of the functions of the management portal, master server, and all management servers. However, preferably, the management servers are located outside of the management center firewall (e.g., firewall 106), whereas the management portal and master server are located inside the management center firewall.

Once the management server(s) receive the VPN data, device configuration process 400 proceeds to 406. The VPN data may be transmitted directly to the management server from the management portal or indirectly via database replication. At 406, management server configuration transfer tools located on board each of the management server(s) create, encode, and encrypt the configuration data and transmit it as a network device configuration file to the respective network device. The management server configuration transfer tools secure an authenticated communication channel prior to transmitting the data via this channel to the respective network device. Typically, the channel is an Internet channel. The databases of the master server and all other management servers, if any, are updated via database replication.

Virtually any method of encoding the files may be incorporated without departing from the scope of the present invention. In one embodiment, the encoding method is based upon the World Meteorological Organization's GRIB encoding format. The encoding method analyzes and reduces the data such that its representation uses the least number of bits. The bitgroups are then concatenated and divided into bytes. The sequential order of the multibyte information strings may also be varied to further increase security of the transmitted data. When this latter aspect is incorporated, the network device and management server configuration transfer tools are programmed with the information required to decode the varied sequential order of the data.

In some embodiments of the present invention, the management server creates network device and VPN configuration files using scripting language. A specific scripting language may be chosen for compatibility with the type of database resident on the management server. For example, the PHP Hypertext Preprocessor ("PHP") scripting language may be incorporated for use with management servers having SQL databases, MySQL databases, or any other type of relational databases. However, alternate databases or alternate scripting languages such as Practical Extraction Report Language ("Perl"), Active Server Page ("ASP"), Digital Command Language ("DCL"), etc. may also be incorporated without departing from the scope of the present invention.

Various algorithms may be incorporated for creation of network device configuration files. In an embodiment of the present invention, a network device configuration file is created through execution of scripting language code that performs the following steps: verifies the current directory; retrieves a filename for the network device configuration file; establishes a connection to the management server database; retrieves the server name; retrieves current data relating to the network device from the management server database; and writes the retrieved data to the network device configuration file, The created network device configuration file is then transmitted to the respective network device.

Similarly, various algorithms may also be used to create VPN configuration files. In one efficient embodiment of the present invention, a VPN configuration file is created through execution of scripting language code that performs the following steps: establishes a connection to the management server database by providing a host, username, and password; retrieves current data relating to all network devices that are a member of a VPN from the management server database; retrieves current data relating to all network devices having the same VPN mesh identifier from the data retrieved in the previous step; sets a configuration file path; writes the VPN member data to a file in the configuration file path; and copies the VPN member data to a VPN configuration file.

Request for network device or VPN configuration files may be received by a management server from a master server, management server, or a management portal. Such requests may be transmitted in a variety of forms such as shell commands or batch files without departing from the scope of the present invention. For example, in an embodiment incorporating shell commands, a shell command may execute a shell that changes the directory to the desired directory and executes the scripting language code that generates one or more of the desired configuration files.

After the network device configuration file is transmitted to the network device, device configuration process 400 proceeds to 408. At 408, the network device configuration transfer tool receives, decrypts, and decodes the network device configuration file. Next, this tool writes the extracted data to designated storage areas within the network device. Also, the network device configuration transfer tool analyzes the extracted data to determine whether a VPN configuration or reconfiguration is required (e.g., a user wishes to create a VPN, a user wishes to delete a VPN, etc.).

The network device configuration file received by the network device includes a variety of configuration parameters including, but not limited to: MAC address of the network device; the name of the network device's primary management server; spam filter settings such as off, mark, or drop; quantity of memory reserved to retain potential spam; a forwarding address for spam; antivirus enable/disable; antivirus handling parameters such as drop or pass; the network address of the host that provides the antivirus daemon with updates to the antivirus engine and signature files; the time interval at which the antivirus daemon should check for updates; HTTP proxy server enable/disable setting; the URL of the policy file; network address of the NTP server; network address of the client that made the last change; the beginning and ending of the range of network address that the DHCP daemon may assign to clients; the network address of the DHCP server lease information; WLAN enable/disable; WLAN identifier information; WLAN broadcast beacon enable/disable; WEP encryption method of WLAN; the key for encryption and decryption of WLAN data packet; WLAN channel; VPN enable/disable; the VPN numeric identifier; network device username; network device password; authentication method; and the network device encoding method.

If the respective network device determines that a VPN configuration, or reconfiguration, is not required, device configuration process 400 proceeds to 422. Reconfiguration is not required, for example, when a member is deleted from the VPN. Referring to FIG. 2, if network device 118*b* is deleted, the remaining network devices 118*a* and 118*c*-118*d* will retain their existing local network addresses. In other words, to conserve computing resources and speed of the system or method as a whole, these network devices will not be renumbered to account for the elimination of the second network device. Also, the numerical identifier associated with the deleted network device 118*b* will not be made available to future VPN members, thereby eliminating any confusion regarding the identity of future VPN members.

However, if reconfiguration is required, device configuration process 400 proceeds to 410. In one embodiment of the present invention, reconfiguration will be required if the VPN variable(s) in the network device configuration file vary from those configured at the network device. For example, comparison of one or more VPN variables in the network device configuration file to the network device's current VPN variable(s) may indicate that the VPN enable/disable setting has changed, that the network device has been added to a VPN, that the VPN mesh identifier has been changed, etc. In one such embodiment of the present invention, a VPN mesh identifier of zero indicates that the network device is not currently assigned to a VPN. Therefore, changing the VPN mesh identifier from zero to another number indicates to the network device that it has been added to a VPN and, therefore, configuration is required. In another embodiment of the present invention, the network device configuration transfer tool requests a VPN configuration file whenever the VPN mesh identifier does not equal zero.

If such a configuration is required, the network device configuration transfer tool requests a VPN configuration file from the respective management server configuration transfer tool at 410. At 410, the management server configuration transfer tool creates a VPN configuration file as discussed in greater detail above. The management server configuration transfer tool then parses the VPN configuration file, adds the authentication data, encodes the configuration and authorization data, and encrypts the resulting encoded data. Next, at 412, the management server configuration transfer tool transmits the augmented VPN configuration file to the respective network device via an authenticated communication channel secured by the management server configuration transfer tool prior to transmission of the data.

At 414, the network device configuration transfer tool receives, decrypts, and decodes the respective VPN configuration file, and writes the received data to the designated storage areas. This data is retrieved from such storage areas by the respective daemons, which reconfigure the network device with the new VPN data contained in the VPN configuration file. For example, the DHCP server may be reconfigured to reserve and assign the static internal network address created for the network device and displayed to the user during the user configuration process. Additionally, other parameters such as scope, address pool, exclusion range, and lease parameters may also be configured.

At 416, the network device configuration transfer tool extracts the current internal and external network addresses of the other VPN members and writes the data to the respective storage locations. Device configuration process 400 then proceeds to 418, at which, a VPN tunnel is created between all VPN members using commonly known methods. That is, the internal routing parameters of each network device are altered such that encrypted connections are established between all network devices having local network addresses.

In one embodiment of the present invention, the VPN tunnel is created using an IPsec protocol. The IPsec protocol authenticates and encrypts all data transmitted via the VPN. However, alternate protocols such as Secure Sockets Layer ("SSL") may be substituted without departing from the scope of the present invention. However, IPsec and similar higher-security protocols are preferred as they provide services at layer three, thereby securing all data on the VPN.

Device configuration process 400 then proceeds to 420 at which an authentication system is implemented. Such a system verifies the integrity of information received from another device. Almost any authentication system may be incorporated without departing from the scope of the present invention including, but not limited to, passwords, digital certificates, smart cards, biometrics, and dynamic biometrics.

The authentication system is implemented by the network device configuration transfer tool. This tool extracts the authentication data after decrypting and decoding the VPN configuration file and writes the extracted data to predetermined storage locations within the network device. Whenever data is transmitted between VPN members, the VPN client daemon is responsible for establishing a secure communication link between the VPN members prior to data transmission. During this process, the VPN client daemon accesses the authentication data stored in the respective storage locations to authenticate the link. Consequently, authentication is implemented or updated whenever a VPN configuration file is received at the network device.

Passwords and digital certificates may be managed solely via software, whereas smart cards, biometrics, and dynamic biometrics typically require both software and hardware located at the network device such as network device 118 or the local device such as local device 122. However, whenever an authentication scheme is implemented, each network device requires additional configuration and setup during the VPN creation process. Via the systems and methods of the present invention, such configuration and setup is performed automatically without user intervention.

Either or both of the network device and VPN configuration files received by each VPN member from its respective management server may contain the necessary authentication information and related information required for proper local configuration of the authentication scheme as discussed above. For example, in some embodiments, if password protection is implemented, such configuration files will contain the usernames and passwords for each VPN member. Upon a change in a VPN member's username or password information, each of the other VPN members are notified of such change in the same manner in which they are notified of an external network address change. That is, the process to update the VPN members with new username and password information for a particular VPN member is a process such as address change process 500, as discussed in further detail below with respect to FIG. 5.

In other embodiments, such configuration files contain digital certificate information such as keys or secrets, user information, and certification authority information. In some embodiments, such keys or secrets are generated and maintained by a third-party certification authority, however, such keys and secrets may also be maintained internal to one or more of the VPN members, management servers, master server, and management center without departing from the scope of the present invention. In either scenario, the digital certificates specify the name of the device as well as its key or secret such that the identity of the sender may be verified.

In yet other embodiments, hardware located at either or both of the network devices and local devices, such as network devices 118 and local devices 122, respectively, receive information used for verification purposes such as biometric information or smart card information. For example, in a smart card embodiment, the hardware may be a smart card reader into which a smart card is inserted. Such a reader may be a drive in a local device such as a personal computer. The information read from the smart card is read and compared to stored data to verify the identity of the user.

Similarly, in biometric embodiments, biometric readers such as fingerprint readers, signature readers, iris readers, and the like may be incorporated. For example, in one embodiment, a biometric mouse is connected to the local devices for fingerprint recognition purposes. Similar to the smart card embodiments, such biometric information is compared to stored data to verify the identity of a user.

After the authentication scheme is implemented, device configuration process 400 proceeds to 422 at which the user may now access any device coupled to the VPN. For example, in the VPN depicted in FIG. 2, a user at local device 122a may access any device coupled to any of the local networks 120a-120d including local devices 122b-122e. At 424, the device configuration ends.

Upon completion of the automatic device configuration process such as automatic device configuration process 400, a VPN has been created between all network devices 118 selected by the user during the user configuration process. An example of a resultant VPN is depicted in FIG. 2

Figure 5:
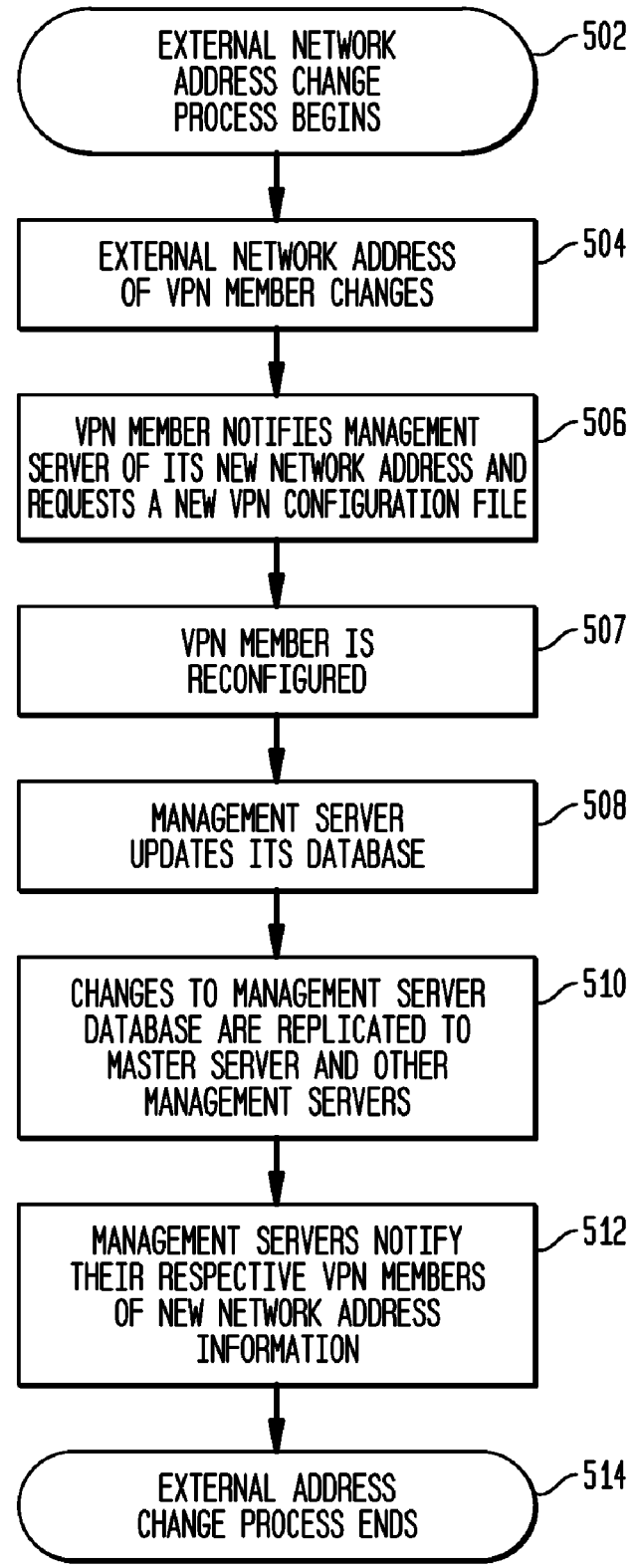
FIG. 5 depicts a flowchart of the steps in one embodiment of a process for updating external network address changes within a VPN.

However, after creation of the VPN, reconfiguration of the VPN will be required if there is a change in the external network address of any VPN member. Such a change may occur, for example, if a member of the VPN changes hosting companies or an existing hosting company changes the assigned external network address. Or, if the external network address is dynamic, it may change due to a timeout from the ISP, removing power from network device 118, or on a regular basis set by the ISP (e.g., every 24 hours). When such a change occurs, the VPN performs a process similar to, but not limited to, external network address change process 500 as illustrated in FIG. 5. This process updates all members of the VPN with the new external network address information.

At 502, external network address change process 500 begins. At 504, the external network address of a VPN member changes and, consequently, the VPN member loses communication with the other VPN members (i.e., it is no longer operating as a member of the VPN). At 506, the VPN member such as network device 118a-118d notifies its respective management server, such as management server 110a or 110b, of its new external network address and requests a new VPN configuration file. This information is transmitted from the network device through a network, such as the Internet, to the respective management server. Once the management server receives the notification, address change process 500 proceeds to 507.

At 507, the VPN member receives an updated VPN configuration file from its management server and is automatically reconfigured as discussed above with respect to FIG. 4. At this point, the reconfigured VPN member re-established communication with the VPN. At 508, the management server updates its database with the new external network address information. At 510, the databases in the master server and other management servers are then updated via database replication or direct transmission of the data between the master and management servers. At 512, each management server configuration transfer tool creates a new VPN configuration file for all of its respective network devices that are VPN members. The newly created VPN configuration files, including the new external network address information, are then transmitted to the respective network devices. Upon receipt, the respective network device configuration transfer tool receives, decrypts, and decodes the VPN configuration file and writes the configuration data to its respective storage locations. Thereafter, one or more daemons retrieve the newly stored data and reconfigure the network device. At 514, all VPN members have received the new external network address information, all components of the VPN have been reconfigured as necessary, and the external network address changes process 500 terminates.

Turning next to FIG. 8, depicted is VPN edit screen 800 as per one embodiment of the present invention. Such a screen may be accessed after a VPN has been created and all VPN members have been added. The description, customer ID, network address, and subnet mask for each network device 118 in the VPN are listed in columns 801, 803, 805, and 807, respectively. A user may now edit or delete the VPN by clicking edit or delete buttons, 809 and 811, respectively. Clicking edit button 809 allows the user to edit or delete individual VPN members, as discussed in greater detail below with respect to FIG. 9. Clicking delete button 811 deletes the entire VPN. That is, each network device 118 reverts to standalone operation and the VPN tunnels are eliminated. The screen depicted in FIG. 8, as well as those depicted in FIGS. 6, 7, and 9, may be accessed in the same manner as the VPN creation screen, as discussed in detail herein.

Figure 6:
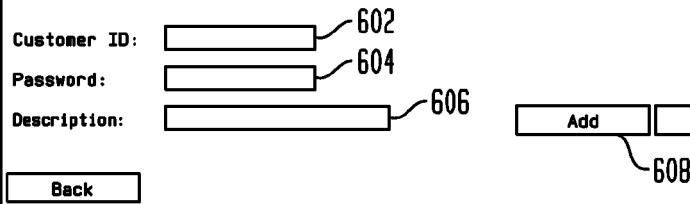
FIG. 6 depicts a GUI screen for initial creation of a VPN according to one embodiment of the present invention.

Referring next to FIG. 9, depicted is VPN edit screen 900 as per an embodiment of the present invention. This, as well as all other screens discussed herein or depicted in FIGS. 6, 7, and 8, are intended to be exemplary only. That is, other screens may be substituted for these screens without departing from the scope of the present invention. Similar to VPN edit screen 800, the customer ID, description, and network address for each network device 118 in the VPN are listed in columns 901, 903, and 905, respectively. However, the subnet mask column is replaced with individual edit and delete buttons 909 and 911, respectively. Clicking edit button 909, allows the user to edit the individual VPN member. For example, the description may be modified. Alternatively, a user may click delete button 911 to delete the VPN member.

Figure 10:
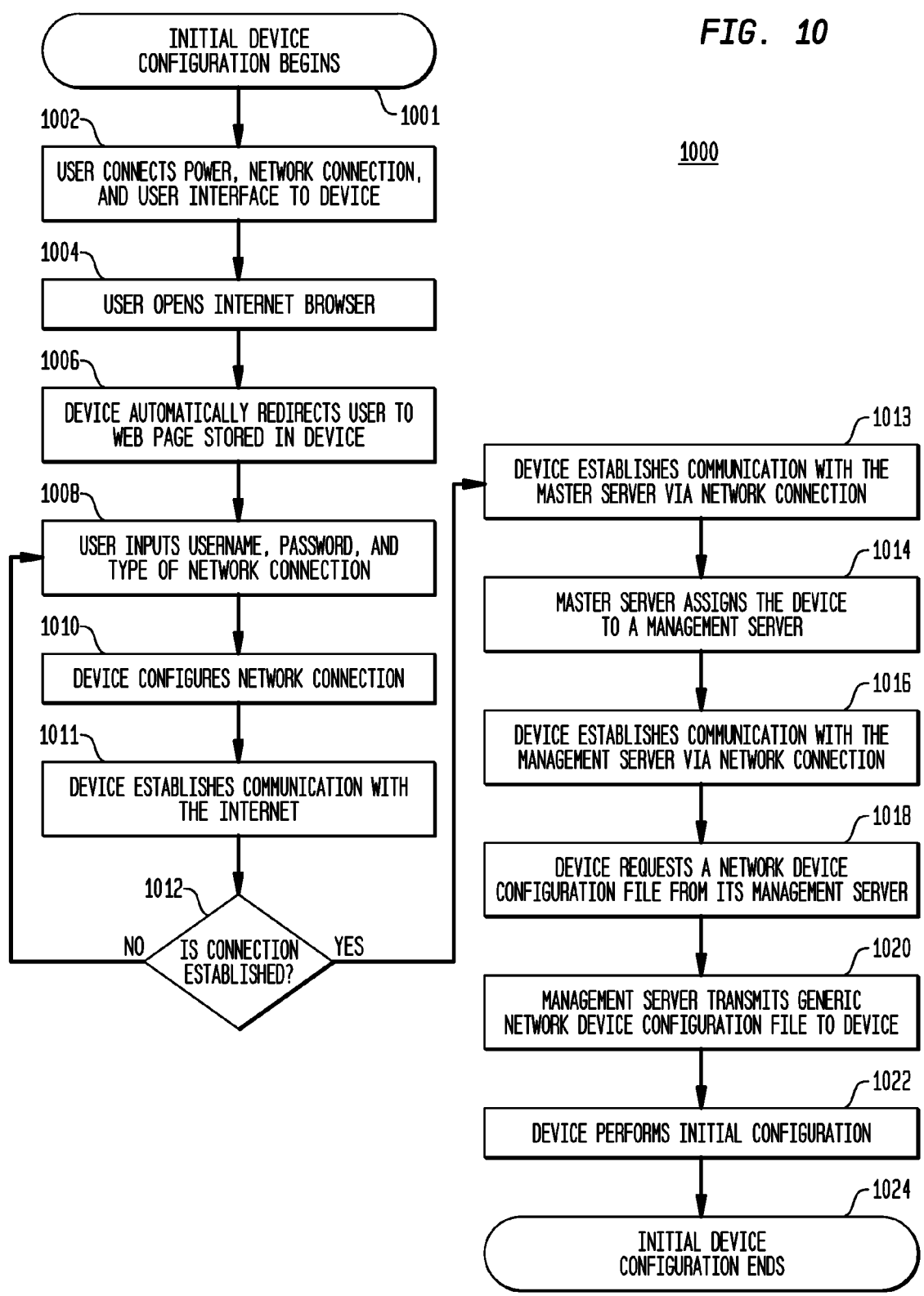
FIG. 10 depicts a flowchart of the steps in one embodiment of a process for initial configuration of a network device according to one embodiment of the present invention.

Turning next to FIG. 10, depicted is network device initial configuration process 1000 as per one embodiment of the present invention. Typically, this process is performed whenever a user receives a new or replacement network device such as network device 118. Network device initial configuration process 1000 begins at 1001, at which a user receives a new network device. At 1002, the user connects the network device to power, a hardwired or wireless network connection, and a user interface. The power connection is typically achieved by plugging a first end of a power cable into the network device and a second end of the power cable into a typical house of office receptacle. Network connections may be made via any commonly available method (e.g., connection to one or more telephone lines via one or more telephone cables, connection to a cable network via a coaxial cable, etc.). User interfaces may be connected to the network interface via a wireless or hardwired connection. Such interfaces may include any interface having a display and means for (e.g., PDAs, personal computers such as local device 122a, etc.).

Network device initial configuration process 1000 then continues to 1004 at which, via the user interface, the user will attempt to initiate a connection to the Internet by a method such as opening an Internet browser. At 1006, the network device automatically redirects the Internet browser from the current HTML page to an HTML setup page stored in the network device. Upon display of the HTML setup page to the user via the user interface, the user is prompted to input a minimal amount of data such as username, password, and the type of network connection coupled to the network device. Upon entry of such data at 1008, network device initial configuration process 1000 proceeds to 1010.

At 1010, the network device automatically configures the network connection based upon the data input by the user, and network device initial configuration process 1000 proceeds to 1011. At 1011, the network device automatically establishes communication with the Internet via the network connection. At 1012, if a connection with the Internet is established, network device initial configuration process 1000 proceeds to 1013. If an Internet connection is not established, network device initial configuration process 1000 returns to 1008.

At 1013, the network device automatically establishes communication with a master server such as master server 108 via the network connection. At 1014, the master server analyzes the data provided by the network device and assigns and directs the network device to one of the management servers such as management servers 110. After terminating communication with the master server, network device initial configuration process 1000 proceeds to 1016, at which the network device establishes communication with its assigned management server. At 1018, the network device requests a network device configuration file from the management server, and process 1000 proceeds to 1020. At 1020, the management server configuration transfer tool transmits a generic encoded and encrypted network device configuration file to the network device.

At 1022, the network device configuration transfer tool decrypts and decodes the generic network device configuration file. Then, this tool extracts the configuration data and writes it to its respective storage locations within the network device. Thereafter, all daemons executed by the network device retrieve their respective data from the configuration data storage locations, thereby performing an initial generic configuration of the network device. Upon completion of its initial configuration, the network device terminates the configuration process 1024. After network device initial configuration process 1000 is complete, the user shall be enabled for basic functions such as, but not limited to, web surfing, electronic mail, etc. Thereafter, a user may customize the network device configuration using the remote management systems and methods of the present invention as described in greater detail with respect to FIGS. 11-19.

Figure 11:
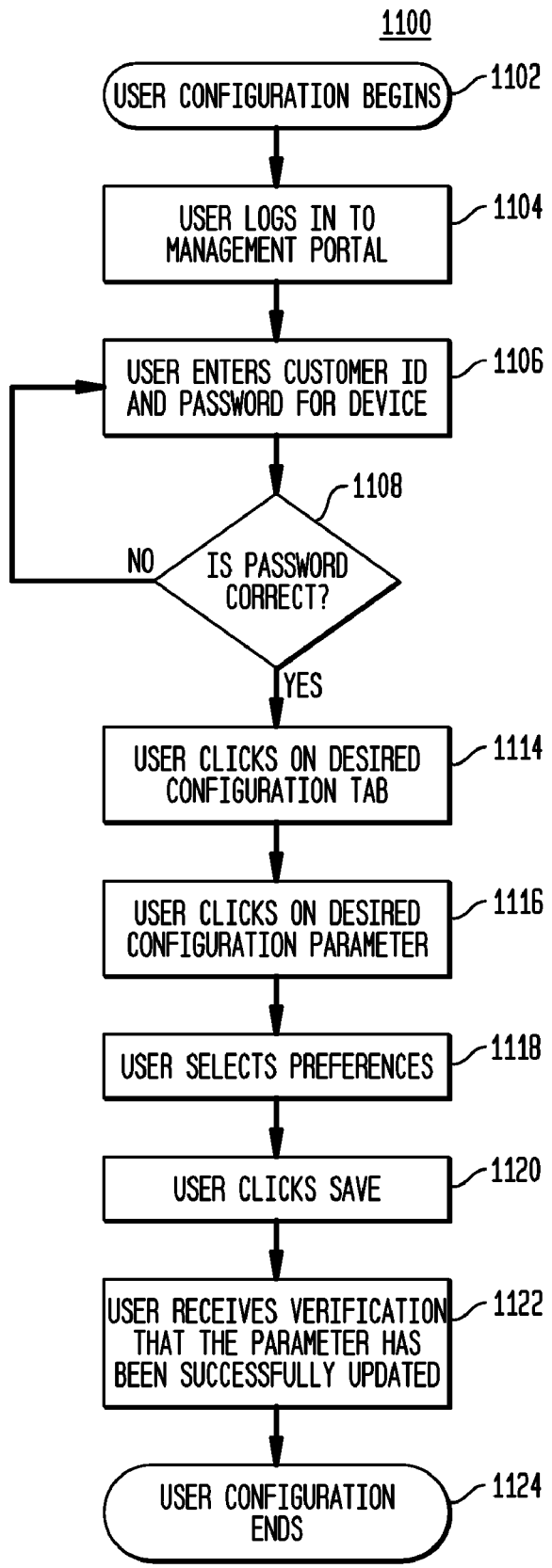
FIG. 11 depicts a flowchart of the steps in one embodiment of a process for user configuration to initiate the automatic modification of a network device configuration.

After an initial generic configuration of the network device, a user may customize the configuration by performing a process similar to, but not limited to, user configuration process 1100 as illustrated in FIG. 11. User configuration process 1100 begins at 1102 at which a user decides to alter the network device configuration. At 1104, the user logs in to a management portal such as management portal 104 using a user interface such as local device 122 coupled to the network device. In one embodiment, the user interface may reside on the same local network (e.g., local network 120) as the network device (e.g., network device 118). In another embodiment, a user may use a user interface such as a personal computer to log in to the management portal through the Internet via the network device's connection of the user interface to the Internet. After the user logs in to the management portal, user configuration process 1100 proceeds to 1106.

At 1106, the management portal to which the user is connected provides a GUI to the user interface. In one embodiment, the GUI is in the form of an Internet web page. At this web page, the user is prompted to enter a customer ID and password. That is, the user is prompted to enter the existing customer ID and password for the network device. Once the user enters the customer ID and password, this data is transmitted via the Internet to the management portal, which verifies the network device's customer ID and password information at 1108. In one embodiment, the management portal accesses the master server's database to determine if the inputted password matches the password information contained in the customer ID's associated data records. In another embodiment of the present invention, management portal accesses a management server's database for this information. However, alternate embodiments of password verification may be incorporated without departing from the scope of the present invention. If, at 1108, the entered customer ID and password are incorrect, user configuration process 1100 returns to 1106 and allows the user to re-enter the information. However, if at 1108, the customer ID and password information are verified, user configuration process 1100 proceeds to 1114.

Figure 13:
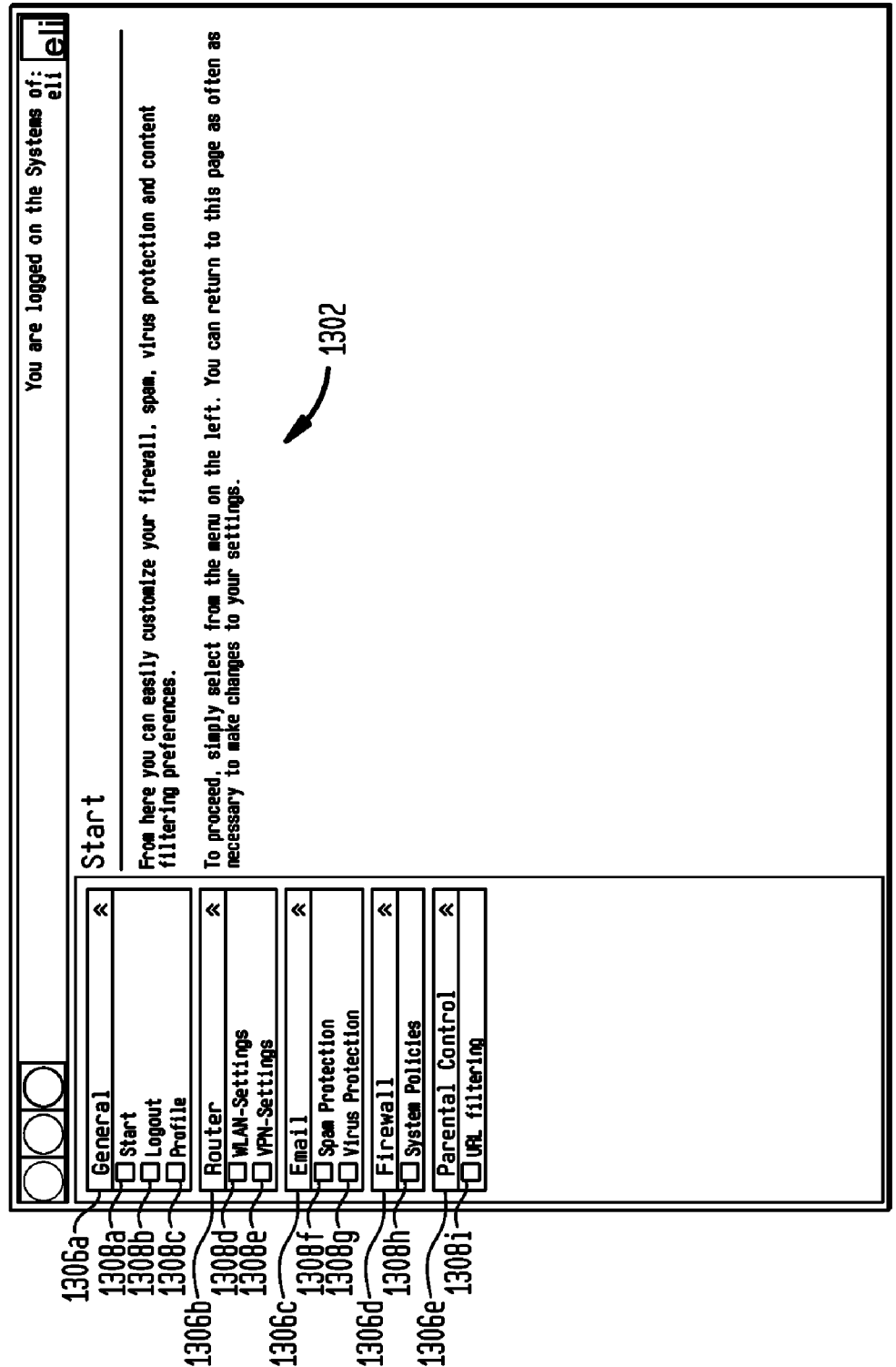
FIG. 13 depicts a GUI screen for the start menu for changing network device configurations according to one embodiment of the present invention.
Figure 15:
FIG. 15 depicts a GUI screen for configuration of a WLAN according to one embodiment of the present invention.
Figure 17:
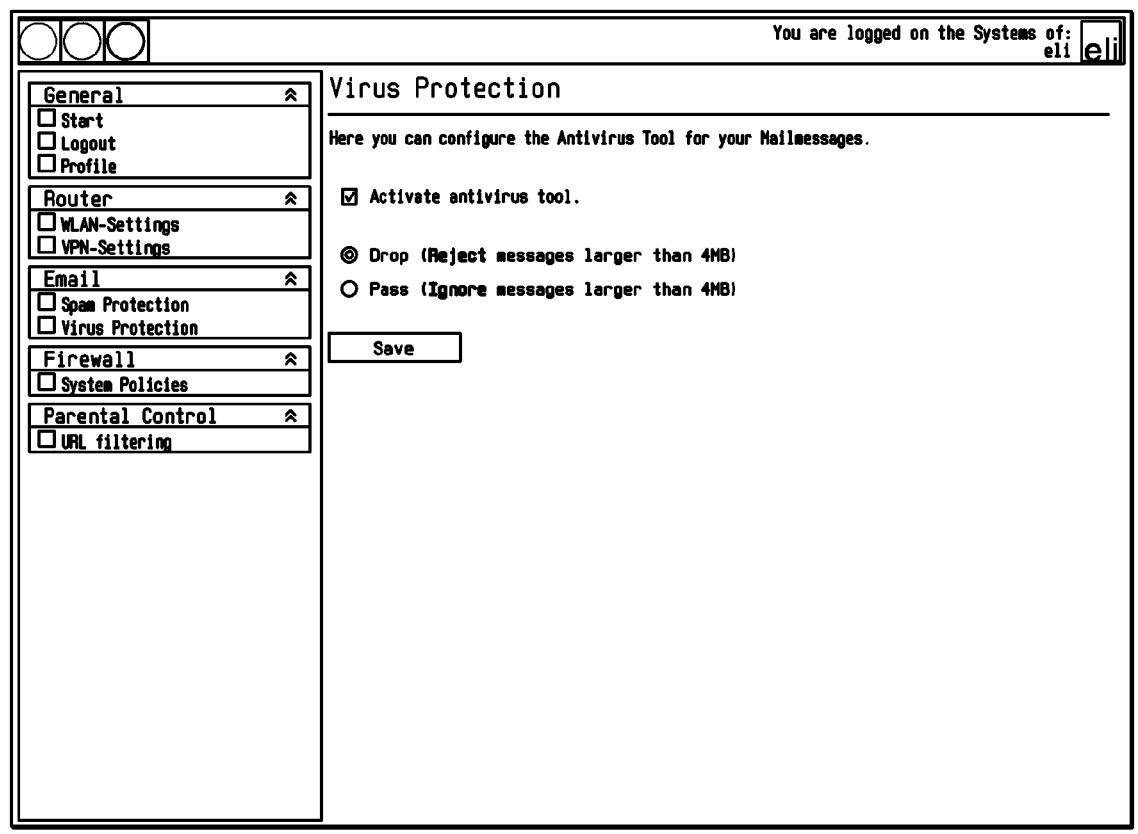
FIG. 17 depicts a GUI screen for the configuration of virus protection according to one embodiment of the present invention.
Figure 18:
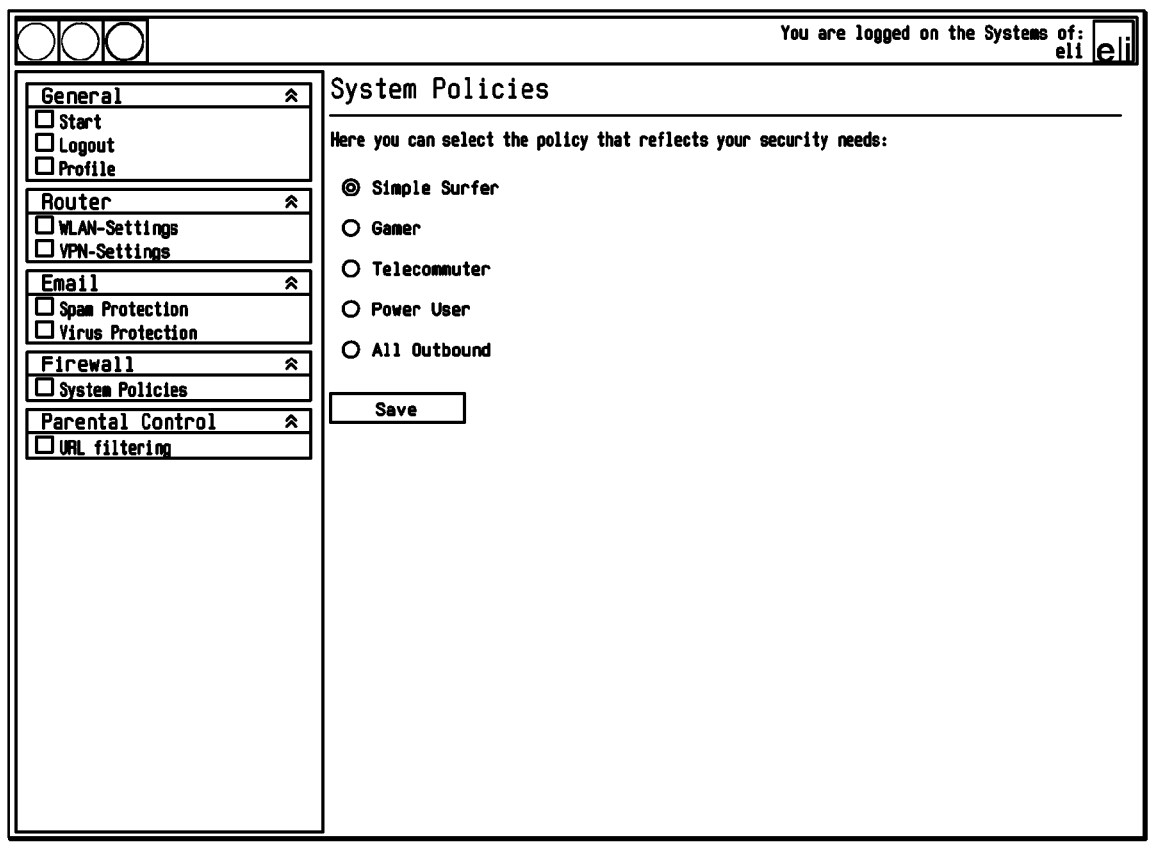
FIG. 18 depicts a GUI screen for the configuration of system policies according to one embodiment of the present invention.

At 1114, a start screen is displayed to the user such as start screen 1300 depicted in FIG. 13. Start screen 1300 contains easy-to-understand and user-friendly instructions 1302. The user clicks on the desired configuration tab of configurations tabs 1306a-1306e located on the left side of start screen 1300, and process 1100 proceeds to 1116. Although start screen 1300 only depicts five configuration tabs 1306a-1306e for general, router, e-mail, firewall and parental control options, respectively, additional options may be included without departing from the scope of the present invention.

At 1116, the user clicks on the desired configuration parameter 1308a-1308i. Based upon the user's selected configuration parameter, a preferences screen such as one of the preference screens 1400, 1500, 1600, 1700, 1800, or 1900 as depicted in FIGS. 14-19 may be displayed at 1118. For example, in the embodiment depicted in FIG. 13, if the user chooses the spam protection parameter 1308f listed below electronic mail configuration tab 1306c, preference screen 1600, as depicted in FIG. 16, is displayed. The user then selects the desired preference via radio buttons 1602a-1602e and user configuration process 1100 proceeds to 1120. At 1120, the user clicks the save button such as save button 1604, and, at 1122, the user receives verification that the configuration parameter has been successfully updated. Thereafter, at 1124, user configuration process 1100 ends.

However, if the user chooses a configuration parameter other than 1308f, such as 1308c, 1308d, 1308g, 1308h, or 1308i, preference screens such as preference screens 1400, 1500, 1700, 1800, or 1900 may be displayed. After being redirected to the requested preference screens, the user simply makes a selection by clicking radio buttons, checkmarks, and the like. When all selections are made for the given configuration parameter, the user clicks the save button as per 1120 of user configuration process 1100 depicted in FIG. 11, and the process completes as described above.

FIGS. 14-19 are provided to demonstrate the simplistic nature of configuring a network device as per the systems and methods of the present invention. However, it should be noted that the format of these displays may be altered without departing from the scope of the present invention. Also, displays depicting configuration parameters other than those included herein may also be added or substituted without departing from the scope of the present invention.

Figure 12:
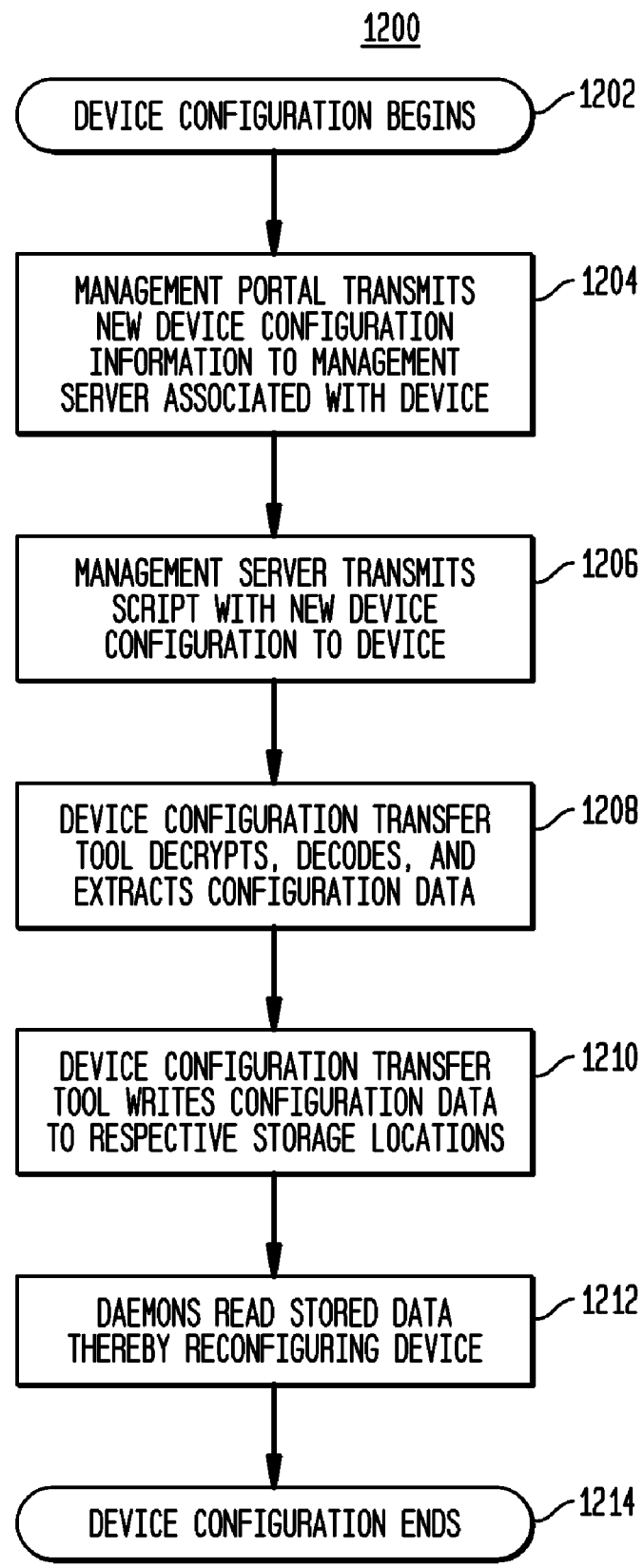
FIG. 12 depicts a flowchart of the steps in one embodiment of a process for automatic modification of a network device configuration.

Upon completion of the user configuration process such as user configuration process 1100, automatic network device configuration occurs using a process similar to network device configuration process 1200 as depicted in FIG. 12. Network device configuration process 1200 begins at 1202 at which a user has finished the user configuration process. At 1204, the management portal to which the user logged in to for entry of the configuration parameters for the network device transmits the new network device configuration data to the management server such as management server 110 responsible for managing the network device. Preferably, such transmission occurs internally within a private network connecting the management portal to the management servers. However, embodiments are envisioned in which the management portal communicates with the management servers via a public network such as the Internet.

Once the management server receives the network device configuration data, network device configuration process 1200 proceeds to 1206. The network device data may be transmitted directly to the management server from the management portal or indirectly via database replication.

At 1206, management server configuration transfer tools located on board each of the management server(s) create, encode, and encrypt the configuration data and transmit it as a network device configuration file to the respective network device as discussed in detail above with respect to FIG. 4. The management server configuration transfer tools secure an authenticated communication channel prior to transmitting the data via this channel to the respective network device. Typically, the channel is an Internet channel.

After the network device configuration file is transmitted to the network device, network device configuration process 1200 proceeds to 1208. At 1208, the network device configuration transfer tool network device 118 receives, decrypts, and decodes the network device configuration file. Next, this tool writes the extracted data to designated storage areas within the network device. Also, the network device configuration transfer tool, decrypts it if required, and analyzes the extracted data to determine whether a VPN configuration or reconfiguration is required (e.g., a user wishes to create a VPN, a user wishes to delete a VPN, etc.).

After the configuration data is written to the respective storage locations, process 1200 proceeds to 1212. At 1212, daemons read the stored data thereby reconfiguring the network devices. At 1214, network device configuration process 1200 ends.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that techniques, systems and operating structures in accordance with the present invention may be embodied in a wide variety of forms and modes, some of which may be quite different from those in the disclosed embodiments, without departing from the spirit and the principles of the invention.

The invention claimed is:

1. A method for automatically reconfiguring a VPN, said method comprising the steps of:
   receiving VPN data input by a user at a portal;
   transmitting said VPN data from said portal to at least one management device;
   creating at least one device configuration file at said at least one management device;
   automatically establishing at least one first communication between said at least one management device and at least one network device via at least one network connection of at least one network;
   transmitting said at least one device configuration file from said at least one management device to said at least one network device via said at least one network connection; and
   analyzing each of said at least one device configuration files locally at said at least one network devices to determine whether reconfiguration of said network device is required and, if said reconfiguration of said network device is required, performing the sub-steps of:
      automatically establishing a second communication between said network device and said management device via said network connection;
      receiving a request at said management device from said network device for a VPN configuration file via said network connection; and
      transmitting said VPN configuration file from said management device to said network device via said network connection;
   wherein at least one VPN is automatically reconfigured upon local processing of at least one of said device configuration file, said VPN configuration file, and combinations thereof.

2. A method according to claim 1, wherein said VPN data includes at least one customer identifier, at least one password, and a VPN name.

3. A method according to claim 1, wherein said network device is at least one of the group consisting of a broadband device, a router, a modem, a switch, a wireless gateway, and combinations thereof.

4. A method according to claim 1, said method further comprising the steps of:
encoding at least one of the group consisting of said device configuration file, said VPN configuration file, and combinations thereof; and
encrypting at least one of the group consisting of said device configuration file, said VPN configuration file, and combinations thereof;
wherein said encoding and said encrypting occur prior to transmission of at least one of the group consisting of said device configuration file, said VPN configuration file, and combinations thereof via said network.

5. A method according to claim 1, wherein said network connection is at least one of the group consisting of a wireless connection, a cable connection, a digital subscriber line, a telephone line, and combinations thereof.

6. A method according to claim 1, wherein said network is at least one of the group consisting of an Internet, a wide area network, and combinations thereof.

7. A method according to claim 1, wherein a configuration transfer tool integral to said at least one management device creates and transmits at least one of the group consisting of said device configuration file, said VPN configuration file, and combinations thereof to said at least one network device.

8. A method according to claim 1, wherein local processing of at least one of the group consisting of said device configuration file, said VPN configuration file, and combinations thereof includes the sub-steps of:
extracting configuration data from at least one of the group consisting of said device configuration file, said VPN configuration file, and combinations thereof; and
writing said device configuration data to at least one storage location of said at least one network device;
wherein at least one daemon executed by each of said at least one network device retrieves and processes at least a portion of said configuration data contained in each of said storage locations.

9. A method according to claim 1, wherein said local processing of at least one of the group consisting of said device configuration file, said VPN configuration file, and combinations thereof includes the sub-steps of:
decrypting at least one of the group consisting of said device configuration file, said VPN configuration file, and combinations thereof;
decoding at least one of the group consisting of said device configuration file, said VPN configuration file, and combinations thereof;
extracting configuration data from at least one of the group consisting of said device configuration file, said VPN configuration file, and combinations thereof; and
writing said device configuration data to at least one storage location of said at least one network device;
wherein at least one daemon executed by each of said at least one network device retrieves and processes at least a portion of said configuration data contained in each of said storage locations.

10. A method according to claim 1,
wherein said portal is a web portal; and
wherein said at least one management device is a server.

11. A method according to claim 1, wherein said transmission of said VPN data from said portal to said at least one management device occurs via database replication.

12. A method according to claim 1,
wherein said portal includes at least one portal database;
wherein said management device includes at least one management device database; and
wherein a change to one of the group consisting of said portal database and said management device database is copied to at least one of the group consisting of said portal database and said management device database via database replication.

13. A method according to claim 1,
wherein said at least one management device includes at least one management device database; and
wherein a change to a first of said management device databases is copied to all remaining management device databases via database replication.

14. A method according to claim 1, wherein said VPN configuration parameter is at least one of the group consisting of a DHCP server parameter, a scope parameter, an address pool parameter, an exclusion range parameter, a lease parameter, and combinations thereof.

15. A method according to claim 1, wherein said configuration parameter is at least one of the group consisting of a VPN parameter, a network parameter, a wide area network parameter, a browsing parameter, an electronic mail parameter, an encryption parameter, a spam parameter, a virus protection parameter, a security parameter, a filtering parameter, an authentication parameter, and combinations thereof.

16. A method according to claim 1, said method further comprising the step of:
querying said at least one network device to determine if said network device is enabled for inclusion in said VPN;
wherein at least one of said device configuration file, said VPN configuration file, and combinations thereof are transmitted to said network devices enabled for inclusion in said VPN; and
wherein said device configuration file and said VPN configuration file are not transmitted to said network devices not enabled for inclusion in said VPN.

17. A method according to claim 1, said method further comprising the step of:
displaying at least one of the group consisting of a numerical identifier of said network device, a description of said network device, a network address of said network device, a VPN position of said network device, a customer identifier of said network device, a VPN name, a subnet mask, and combinations thereof to said user.

18. A method according to claim 1, wherein said reconfiguration of said VPN includes at least one of the group consisting of deleting said VPN, adding one of said network devices to said VPN, deleting one of said network devices from said VPN, and combinations thereof.

19. A method according to claim 1, wherein said portal and said management device are a single device.

20. A method according to claim 1, wherein said VPN configuration file is not required upon deletion of one of said network devices from said VPN.

21. A method according to claim 1, wherein said determining whether said VPN configuration file is required is performed by comparing at least one new VPN parameter to at least one previous VPN parameter.

22. A method according to claim 1, wherein said VPN configuration file is required whenever a VPN mesh identifier of a received one of said device configuration files is not equal to zero.

23. A method according to claim 1, wherein said VPN configuration file is requested by a network device configuration transfer tool.

24. A method according to claim 1, wherein said method further comprises:
assigning at least one of the group consisting of a numerical identifier, a network address, a VPN position, and combinations thereof to said at least one network device.

25. A method according to claim 24, wherein said numerical identifier is assigned to said at least one network device based upon its respective order of entry to said VPN.

26. A method according to claim 24, wherein said network address is an Internet protocol address.

27. A method according to claim 1, wherein said receiving of said VPN data input by said user at said portal includes the sub-steps of:
displaying at least one data input screen to said user via at least one of the group consisting of a network browser and an Internet browser; and
receiving said VPN data input by said user into said at least one data input screen at said portal via at least one of the group consisting of said network connection and an Internet connection;
wherein at least one of said data input screens prompts said user to perform at least one of the group consisting of selecting said VPN data from a predefined list of said VPN data, entering said VPN data in predefined user data fields, and combinations thereof.

28. A method according to claim 27, wherein at least one of said data input screens is provided by said portal.

29. A method according to claim 1, wherein said user data is input by said user via a user interface coupled to said network device.

30. A method according to claim 29, wherein said user interface is at least one of the group consisting of a personal computer, a personal data assistant, and a network-equipped appliance.

31. A method according to claim 29, wherein said coupling of said user interface to said network device is at least one of the group consisting of a cable, an Ethernet cable, a wireless connection, a local area network, a wide area network, an Internet connection, and combinations thereof.

32. A method according to claim 1, said method further comprising the step of:
authenticating at least one communication channel prior to said establishing of at least one of said first communication, said second communication, and combinations thereof between said at least one management device and said at least one network device.

33. A method according to claim 32, wherein said authenticating is performed using at least one of the group consisting of IP security, secure sockets layer, passwords, digital certificates, smart cards, biometrics, dynamic biometrics, and combinations thereof.

34. A method according to claim 1, wherein one of said management devices is a master device.

35. A method according to claim 34, wherein said portal and said master device are a single device.

36. A method according to claim 1, wherein at least one of the group consisting of said device configuration file, said VPN configuration file, and combinations thereof is created using at least one of the group consisting of a scripting language, a shell command, a batch file, and combinations thereof.

37. A method according to claim 36, wherein said scripting language is selected from the group consisting of PHP Hypertext Processor, Practical Extraction Report Language, Active Server Page, Digital Command Language, and combinations thereof.

38. A method according to claim 36, wherein said scripting language executes the following steps:
verifying a current directory;
retrieving a filename for one of said at least one device configuration files;
establishing a connection to a database of one of said at least one management device;
retrieving current data from said database; and
writing said current data to at least one of the group consisting of said device configuration file, said VPN configuration file, and combinations thereof.

39. A method according to claim 36, wherein said scripting language executes the following steps:
establishing a connection to at least one database of said at least one management device by providing at least one name, at least one username, and at least one password to said at least one management device;
retrieving current data for each of said network devices in said VPN from said at least one database;
retrieving said current data of said network devices having equivalent VPN mesh identifiers;
setting a configuration file path;
writing said current data to a file in said configuration file path; and
copying said current data to said VPN configuration file.

40. A method according to claim 1, wherein said network devices of said VPN are automatically updated upon a change to one of said network devices of said VPN.

41. A method according to claim 40, wherein said change includes a change to an external address of said network device.

* * * * *